United States Patent [19]　　　[11] 3,873,644
Pampus et al.　　　[45] Mar. 25, 1975

[54] GRAFT POLYMERS
[75] Inventors: Gottfried Pampus, Leverkusen;
　　　　　　　Josef Witte, Cologne-Stammheim;
　　　　　　　Martin Hoffmann, Bergedorf-
　　　　　　　Gladbach, all of Germany
[73] Assignee: Bayer Aktiengesellschaft,
　　　　　　　Leverkusen, Germany
[22] Filed: Dec. 21, 1971
[21] Appl. No.: 210,594

Related U.S. Application Data
[63] Continuation-in-part of Ser. No. 72,790, Sept. 16, 1970, abandoned.

[30]　　Foreign Application Priority Data
　　　Oct. 28, 1969　Germany............................ 1954092
　　　Apr. 7, 1970　Germany............................ 2106471

[52] U.S. Cl. ............................ 260/879, 260/878 R
[51] Int. Cl. ......................... C08f 15/04, C08f 19/08
[58] Field of Search............... 260/879, 94.7 D, 93.1

[56]　　　　References Cited
　　　　　UNITED STATES PATENTS
3,520,856　7/1970　Dall'Asta ...................... 260/85.3 X
3,631,010　12/1971　Witte et al. ........................ 260/93.1
3,632,849　1/1972　Pampus et al. .................... 260/93.1
3,649,709　3/1972　Medema et al. ................ 260/680 R
3,707,520　12/1972　Pampus et al. ................. 260/879 X Primary Examiner—Harry Wong, Jr.
Assistant Examiner—Maria S. Tungol
Attorney, Agent, or Firm—Connolly and Hutz

[57]　　　　ABSTRACT

Method for producing graft polymers from a cyclic olefin as graft monomer and from a polymer containing carbon-carbon double bonds as the grafting base wherein the grafting reaction is effected by a catalyst comprising
　a. a compound of a metal of Group VB or VIB of the Mendeleev Periodic System, and
　b. an organic compound of a metal of Group IA to IIIA of the Mendeleev Periodic System,
and graft polymers obtained in this process.

6 Claims, No Drawings

GRAFT POLYMERS

This application is a continuation-in-part of application Ser. No. 72,790 filed Sept. 16, 1970, now abandoned.

It is known that cyclopentene, in the presence of organometallic mixed catalysts based on organic aluminium compounds —O—tungsten salts, can undergo ring-opening and polymerisation, to form linear high molecular weight unsaturated hydrocarbons whose carbon-carbon double bonds have for the most part a trans-configuration.

British Patent Specification No. 1,010,860 relates to a process for the bulk polymerisation of cyclopentene accompanied by ring-opening and the formation of trans-polypentenamers. Unfortunately, this process has a serious disadvantage which makes it extremely difficult to work on a commercial scale. The bulk polymerisation reaction results in the formation of such highly viscous reaction mixtures that it is impossible to control temperature during the polymerisation reaction. In addition, the polymerisation reaction can only be continued up to relatively low conversions, for example from 20 to 50%, if it is desired to obtain an uncrosslinked, processible polymer. At higher conversions, insoluble crosslinked products are obtained which are of no commercial interest.

The present invention relates to a process for the production of graft polymers from an unsaturated polymer as graft base and a cyclic olefin as graft monomer, in which a cyclic olefin is ring-opened and polymerised with a polymer containing carbon-carbon double bonds, dissolved in an inert organic solvent, in the presence of a catalyst comprising:

a. a compound of a metal of Group VB or VIB of the Mendeleev Periodic System, and
b. an organic compound of a metal of group IA to IIIA of the Periodic System.

Examples of compounds of metals of groups VB and VIB of the Periodic System include halides and oxyhalides such as fluorides, chlorides, bromides, iodides and corresponding oxyhalides of vanadium, niobium, tantalum, chromium, molybdenum and tungsten and alkali metal (preferably potassium) salts of chlorotungsten acids or chloromolybdenum acids.

Examples of organic compounds of metals of groups IA to IIIA of the Periodic System include alkyl, alkoxy and halogenoalkyl compounds of aluminium; alkyl and halogenoalkyl compounds of magnesium and beryllium; and alkali metal alkyls (for example of Na, K and Li), alkyl and alkoxy having preferably 1 – 12 carbon atoms.

The invention also relates to graft copolymers comprising from 0.1 to 90 % by weight, based on the total polymer, of a diene homopolymer or copolymer as graft base, and from 99.9 to 10 % by weight of a cyclic olefin graft polymerised with ring-opening.

Examples of polymers containing carbon-carbon double bonds which are suitable as grafting bases in the process of the invention include homopolymers and copolymers of conjugated dienes, preferably those having 4 - 8 carbon atoms, for example of 1,3-butadiene, isoprene, piperylene and 2-chlorobutadiene, for instance, 1,2-polybutadiene, cis-1,4-polybutadiene, 1,2- and 3,4-polyisoprene, cis-1,4-polyisoprene, poly-2-chlorobutadiene, and random or block copolymers of such conjugated diolefins and a monoolefinically unsaturated copolymerisable compound. Examples of such compound are aromatic monovinyl compounds such as styrene, α-methylstyrene, vinyltoluene, chlorostyrene and aliphatic monovinyl compounds such as alkyl esters (alkyl $C_1$–$C_6$) of acrylic and methacrylic acid (e.g. methylmethacrylate, ethylacrylate, tert.-butylacrylate) and acrylic acid and methacrylic acid nitriles such as acrylonitrile. Most preferred are copolymers of styrene and butadiene, whose butadiene units are incorporated in the 1,4- and/or 1,2-position. The weight ratio of styrene to butadiene is from 95:5 to 5:95.

The following are also suitable: ethylene-propylene terpolymers containing, for example, from 20 to 80 parts by weight of ethylene and from 80 to 20 parts by weight of propylene and, in addition, up to 20 parts by weight of a third component. Examples of suitable third components include 1,5-hexadiene, 1,4-hexadiene, dicyclopentadiene, norbornadiene, methylene norbornene and ethylidene norbornene. Other unconjugated dienes are, of course, also suitable.

Suitable cyclic olefins include those with 4 to 20, preferably 5 to 12 carbon atoms in the ring (except cyclohexene) and one carbon double bond or 2, 3 or more unconjugated carbon double bonds, such as cyclobutene, cyclopentene, cyclooctene, cyclododecaene, cyclooctadiene-1,5, cyclododecatriene-1,5,9, cyclopentene being preferred.

Catalysts comprising a compound of a metal of group VB or VIB of the Periodic System and an organic compound of a metal of groups IA to IIIA of the Periodic System are used in the process according to the invention. It is preferred to use a catalyst comprising:

a. a tungsten, tantalum or molybdenum halide or oxyhalide, such as fluorides, oxyfluorides, chlorides, oxychlorides, bromides, oxybromides, iodides and oxyiodides e.g. $WF_6$, $WBr_6$, $WCl_6$, $WJ_6$, $WCl_4O$, $WBr_4O$, $MoCl_5$, $MoCl_3$, $MoCl_3O$, $MoBr_5$, $MoBr_3O$, $MoJ_5$, $TaCl_5$, $TaF_5$, $TaBr_5$, $TaJ_5$, $TaCl_3O$, $TaBr_3O$ b. an organoaluminium compound of the formula

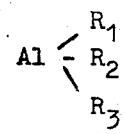

wherein $R_1$ represents alkyl having 1 to 12 carbon atoms, $R_2$ and $R_3$ represent indepently hydrogen, alkyl having 1 to 12 carbon atoms, halogen such as fluorine, chlorine, bromine, or iodine, alkoxy having 1 to 12 carbon atoms. Examples of such compounds are aluminium trialkyl, for example $Al(C_2H_5)_3$, $Al(C_8H_{17})_3$ or Al(isoC$_4$H$_9$); aluminium halogen alkyl, for example $Al(C_2H_5)_2Cl$, $Al(C_2H_5)_2Br$, $Al(C_2H_5)Cl_2$; or $Al(C_2H_5)_2I$, aluminium alkoxyl alkyl, for example $Al(C_2H_5)_2OC_2H_5$.

Tungsten halides are particularly preferred as compound (a).

The molar ratio of (a) to (b) is preferably from 1:0,5 to 1:15. The activity of the catalyst can be increased by co-catalysts which can be added in a molar ratio of component a):co-catalyst of 1:0,3 to 1:10. Examples of co-catalysts such as these include:

1. Epoxidic compounds of the general formula:

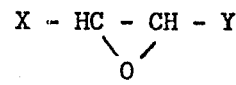

X = H, alkyl having 1 to 6 carbon atoms, aryl having 6 to 10 carbon atoms or aralkyl (alkyl moiety 1 to 6 carbon atoms, aryl moiety 6 to 10 carbon atoms)

Y = X, —CH$_2$Hal(Hal= Cl, Br or I) or —CH$_2$—O—R (R = alkyl or aryl as defined in X)

2. halogen-containing alcohols of the general formula:

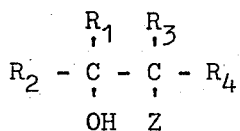

in which

Z represents chlorine, bromine or iodine,

R$_1$ and R$_2$ are the same or different and each represents hydrogen, an alkyl, an haloalkyl (preferably chloroalkyl), aryl or aralkyl radical (alkyl C$_1$-C$_6$; aryl C$_6$-C$_{10}$), R$_3$ and R$_4$ are the same or different and represent chlorine, bromine, or iodine, hydrogen or an alkyl, aryl or aralkyl radical (alkyl C$_1$-C$_6$; aryl C$_6$-C$_{10}$) or R$_1$ and R$_3$, together with the carbon atoms to which they are attached, form a 5-; 6- or poly-membered hydrocarbon ring; and 3. phenols corresponding to the general formula:

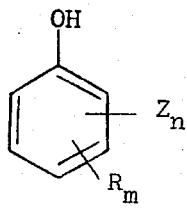

in which

Z is as defined above, each

R represents an alkyl (C$_1$-C$_6$), aryl (C$_6$-C$_{10}$) or a fused aromatic radical, and n represents a number from 1 to 4, and m is 0 to 4, preferably 0 or 1.

Examples of suitable co-catalysts include ethylene oxide, propylene oxide, epichlorhydrin, butadiene monooxide. phenoxypropylene oxide, glycidylether, isopropylglycidylether, 2-chlorethanol, 2-bromethanol, 2-iodoethanol, 1,3-dichloro-2-propanol, 2-chlorocyclohexanol, 2-chlorocyclopentanol, o-, m- or p-chlorophenol and o-, m- or p-bromophenol.

To prepare these catalysts, the tungsten salt can be reacted with the co-catalyst in the presence of a hydrocarbon as solvent, usually in the same solvent in which the polymerisation reaction is carried out, and approximately 0.05 to 0.5 molar solutions are used.

The quantity in which the catalyst is used generally corresponds to from 0.1 to 4 mMol of the metal of Group VB or VIB per 100 g of monomer.

The process can be carried out by successively adding the catalyst components to a solution of the cyclic olefin and the polymer containing carbon-carbon double bonds in a suitable solvent, and then allowing the polymerisation reaction to take place. There is no need for separate preparation of the catalyst. The polymerisation reaction is preferably carried out in the absence of air and moisture, for example in an inert gas atmosphere (e.g. nitrogen or argon). The order in which the catalyst components is added is not critical, although the following sequence is preferred: component (a)/co-catalyst/component(b).

The catalysts can be prepared at temperatures of from —60 to +60°C, and preferably at temperatures of from —20 to +20°C.

It can be of advantage to react the tungsten salt, for example tungsten hexachloride, with the co-catalyst initially in a small proportion of the solvent used for the polymerisation reaction, because it is possible in this way to obtain much more concentrated solutions of the tungsten compound. This solution can then be added to the solvent-monomer-polymer mixture, followed by component (b), e.g. an organoaluminium compound. Polymerisation begins immediately following the addition of the organoaluminium compound. The polymerisation temperature can be in the range from —60 to +60°C, although it is preferably in the range of from —20 to +20°C. The polymerisation time is usually from 1 to 5 hours.

The polymers containing carbon-carbon double bonds are dissolved, for example, in a proportion of the hydrocarbon used as the polymerisation medium. These solutions are generally added to the monomer solution before the catalyst components are introduced. These solutions can, however, also be added at any time during polymerisation of the cyclic olefin.

The unsaturated polymer used as graft base can preferably be employed in a quantity of from 0,1 to 90 % by weight, and most preferably from 1 to 20 % by weight, based on the cyclic olefin.

Solvents suitable for use in the process include aliphatic hydrocarbons such as butane, pentane, isooctane, hexane; cycloaliphatic hydrocarbons such as cyclohexane; or aromatic hydrocarbons such as benzene, toluene or xylene. It is possible to employ from 5 to 50 weight-% solutions of cyclopentene in the aforementioned solvents for the process. The process is preferably carried out with monomer concentrations of from 10 to 30 wt.-%.

The process can be carried out either continuously or in batches.

The products obtained by the process described in the foregoing differ in their properties, depending on the type and quantity of graft base used. The products can be crosslinked, for example, with radical formers or sulphur-containing systems, and may be used in the production of elastomeric materials. This applies especially when small quantities of graft base are present in the graft polymer, for example from 0.1 to 20 wt.-%, based on the total polymer. With larger quantities of graft base, especially more than 50 wt.-%, it is possible to obtain thermoplastic products of high impact strength. The properties of the graft polymers are also influenced by the type and composition of the graft base. The more resin-like the graft base (for example high styrene content), the more noticeable the thermoplastic properties.

EXAMPLE 1 a. Preparation of 1,2-polybutadiene 20,000 ml of benzene and 2500 g of butadiene are introduced into an autoclave equipped with a stirring mechanism. The mixture has a water content of 1.8 ppm. 10.7 ml of glycol dimethyl ether and 85 mM of n-butyl lithium, in the form of a 1-molar solution in hexane, are then added at −8°C. On completion of polymerisation, the product is precipitated with methanol, stabilised with 2,6-di-tert-butyl-4-methyl phenol (0.2%) and dried in vacuo at 50°C. The conversion amounts to 98.5%; ($\eta$) toluene, 25°C = 0.65; 1,2-bond content: 78%.

b. Graft polymerisation of cyclopentene on to 1,2-polybutadiene 20 g of 1,2-polybutadiene (according to a) are dissolved in 900 ml of dry toluene in a vessel equipped with a stirring mechanism. 200 g of cyclopentene are then added. Following the addition of 1.6 mM of the reaction product of tungsten hexachloride and chlorethanol in a molar ratio of 1.0 (in the form of a 0.05 molar solution in toluene), the mixture is cooled to −5°C. Polymerisation begins immediately following the addition of 3.5 mMol of aluminium diethyl monochloride. The polymerisation temperature can be increased to +5°C over a period of 4 hours. Polymerisation is then stopped by the addition of 0.5 ml of ethanolamine, 20 ml of ethanol, 1 g of 2,2'-dihydroxy-3,3'-di-tert-butyl-5,5'-dimethyl diphenylmethane dissolved in 100 ml of toluene. The graft polymer is precipitated with ethanol and dried in vacuo at 60°C.

The yield comprises 74%; ($\eta$) toluene, 25°C = 1.84; ML 4'/100°: 52; Defo (80°C): 650/37.

Physical-chemical investigation of the graft polymer by turbidity titration and precipitation fractionation, and examination of the fractions to determine their IR extinction and refractive index at 60°C, show a degree of grafting of 100%.

Turbidity titrations: solutions of 5 mg of polymer in methylene chloride are titrated with methanol at 35°C, single-peak solubility distributions being obtained in the case of polybutadiene and the graft polymers.

Fractionation: 1% benzene solutions are subjected to fractional precipitation at 40°C by the addition of methanol and left to settle overnight at 25°C. The fractions are recovered by decantation and dried. Their refractive index at 60°C can readily be determined with an Abbe refractometer. The decadic extinctions of films of these fractions were determined at 11 $\mu$ and 10.35 $\mu$ and compared with one another. The ratio is substantially proportional to the polybutadiene component.

The intrinsic viscosities of the fraction were determined in toluene at 25°C.

The graft polymer described above gave the following analytical data:

| Fraction | % by weight | ($\eta$) | $n_D^{60}$ | $\epsilon 11\ \mu/\epsilon\ 10.35\ \mu$ |
|---|---|---|---|---|
| 1 | 28.6 | 3.19 | 1.4986 | 0.144 |
| 2 | 12.4 | 2.61 | 1.4980 | |
| 3 | 22.6 | 2.01 | 1.4978 | 0.089 |
| 4 | 4.4 | 1.53 | 1.4973 | |
| 5 | 17.4 | 1.24 | 1.4975 | 0.098 |
| 6 | 6.8 | 0.73 | 1.4980 | |
| R | 7.3 | 0.34 | 1.4991 | |

| | $n_D^{20}$ |
|---|---|
| polybutadiene initially introduced | 1.4950 |
| polypentenamer | 1.4973 |

Considerable quantities of polybutadiene are found in fractions 1, 3 and 5 by infra-red analysis. None of the fractions has a refractive index which is close to that of the polybutadiene; in other words, it was not possible to isolate ungrafted polybutadiene.

The fact that the polybutadiene components of very different fractions are comparable in size, and the fact no ungrafted polybutadiene could be isolated, shows that all the polybutadiene was grafted.

EXAMPLES 2 4

2 to 10 parts by weight of 1,2-polybutadiene (according to Example 1a) are dissolved in 1300 parts by volume of dry toluene in a vessel equipped with stirring mechanism. 200 Parts by weight of cyclopentene are added to the solution in the absence of oxygen and moisture. This is followed by the addition at room temperature of 3.5 parts by volume of a 0.2 molar solution (based on tungsten) of a reaction product of $WCl_6$ and epichlorohydrin in a molar ratio of 1:2 in toluene, after which the mixture is cooled to −10°C. 2.2 Parts by volume of a 1-molar solution of $Al(C_2H_5)_2Cl$ in toluene are then added. Polymerisation begins immediately and, following a gradual increase in temperature to +5°C, is stopped after 3 hours by the addition of 1 part by weight of ethylene diamine and 0.5 part by weight of 2,6-di-tert-butyl-4-methylphenol dissolved in 20 parts by volume of toluene. The polymers are precipitated with ethanol and dried in vacuo at 60°C.

The reaction conditions are set out in the following table:

Table 1

| Example No.: | 2 | 3 | 4 |
|---|---|---|---|
| toluene (ml) | 1300 | 1300 | 1300 |
| 1,2-polybutadiene (g) | — | 2 | 10 |
| cyclopentene (g) | 200 | 200 | 200 |
| $WCl_4(OCH_2CH\text{-}Cl\text{-}CH_2Cl)_2$, 0.2 m in toluene (ml) | 3.5 | 3.5 | 3.5 |
| Temperature, °C | −10 | −10 | −10 |
| $Al(C_2H_5)_2Cl$, 1.0 m in toluene (ml) | 2.2 | 2.2 | 2.2 |
| Polymerisation time and temperature (hours/°C) | 3 hours | at | −10°/+5°C |
| Yield (g) | 146 | 151 | 156 |
| ($\eta$) toluene 25°C | 1.93 | 1.92 | 1.77 |
| Defo (80°C) | 190/3 | 220/7 | 260/12 |
| ML-4'/100°C | 44 | 42 | 37 |

It is clear from the viscosity data that the degree of branching through grafting increases with an increase in the quantity of 1,2-polybutadiene mixture (decrease in solution viscosity ($\eta$) and increase in Defo hardness and elasticity).

EXAMPLE 5 a. Preparation of a butadiene-styrene copolymer

A mixture of 85 g of butadiene and 165 g of styrene is dissolved in 3000 ml of toluene. 36 ml of glycol dimethyl ether and 3 to 6 mM of n-butyl lithium are then added at 0°C in the absence of oxygen and moisture. Polymerisation is carried through to completion at 40°C. The copolymer is stabilised with 0.1% of 2,6-di-tert-butyl-4-methylphenol, precipitated with ethanol and dried in vacuo at 100°C.

Conversion: 98%; ($\eta$) toluene 25°C = 0.3.

b. Graft polymerisation 20 g of the copolymer prepared in accordance with 5a are dissolved in 900 ml of dry toluene and grafted with cyclopentene as described in Example 1b. The product is then worked up as described in Example 1b.

160 g of graft polymer ($\eta$) toluene 25°C = 2.1, are obtained after precipitation.

Examination of the product obtained as described in Example 1 shows that only 3 % of the copolymer initially introduced has remained ungrafted.

EXAMPLE 6

20 g of a block copolymer of butadiene-styrene (50:50 mol %, 1,4-component in the butadiene block = 88%, ($\eta$) = 0.3) are dissolved in 900 ml of dry toluene. The further procedure is then as described in Example 1b. A graft copolymer is obtained in a yield of 50%, based on the cyclopentene used, with a degree of grafting of 100%.

The Defo hardness and elasticity (at 80°C) were 2650/38, whilst the intrinsic viscosity ($\eta$) toluene 25°C was 2.19.

A comparison test carried out in the absence of the graft base produces a rubber-like trans-polypentenamer. Defo 1150:9 (80°C), ($\eta$) toluene 25°C = 3.04.

EXAMPLE 7

As in Example 1b, 50 g of a terpolymer of 42 parts by weight of propylene, 50 parts by weight of ethylene and 8 parts by weight of dicyclopentadiene [($\eta$) toluene 25°C = 2.7] are dissolved in 900 ml of dry toluene in a vessel equipped with stirring mechanism. 200 g of cyclopentene are added. This is followed by the addition of 2.0 mMols of a reaction product of tungsten hexachloride and epichlorohydrin in a molar ratio of 2.0 (in the form of a 10% solution in toluene) and 4 mMols of diethyl aluminium chloride (in the form of a 1-molar solution in toluene). The reaction temperature is −10°C. The temperature is allowed to rise gradually to +10°C over a period of 3 hours. After the reaction product has been isolated by precipitation with 2000 ml of ethanol, a graft copolymer with an ($\eta$) value (toluene 25°C) of 1.7 is obtained in a yield of 230 g.

It was established through fractional precipitation (benzene/methanol) and infra-red spectroscopy that the graft base was present in all the fractions.

We claim:

1. A process for the production of graft polymers which comprises polymerizing, as graft monomer, a cyclic olefin containing 4, 5 or from 7 to 20 carbon atoms in the ring and having one carbon to carbon double bond or two or more unconjugated carbon to carbon double bonds onto a graft base polymer containing carbon to carbon double bonds, said polymerization being carried out in an inert organic solvent at −60° to 60°C. and in the presence of a catalyst comprising
   a. a tungsten, tantalum or molybdenum halide or oxyhalide,
   b. an organoaluminum compound of the formula

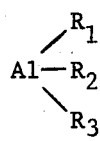

wherein $R_1$ is alkyl having 1 to 12 carbon atoms and $R_2$ and $R_3$ independently are hydrogen, alkyl having 1 to 12 carbon atoms, halogen or alkoxy having 1 to 12 carbon atoms and
   c. a cocatalyst which is
   i. an epoxide of the formula

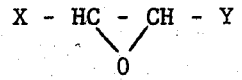

wherein X is hydrogen, alkyl having 1 to 6 carbon atoms, aryl having 6 to 10 carbon atoms or aralkyl having 6 to 10 carbon atoms in the aryl moiety and 1 to 6 carbon atoms in the alkyl moiety and Y is hydrogen, alkyl having 1 to 6 carbon atoms, aryl having 6 to 10 carbon atoms, aralkyl having 6 to 10 carbon atoms in the aryl moiety and 1 to 6 carbon atoms in the alkyl moiety, −CH₂Hal wherein Hal is chlorine, bromine, or iodine or −CH₂−O−R wherein R is alkyl having 1 to 6 carbon atoms or aryl having 6 to 10 carbon atoms or
   ii. a halogen-containing alcohol of the formula

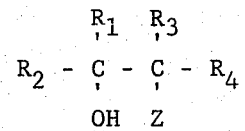

wherein Z is chlorine, bromine or iodine, $R_1$ and $R_2$ are the same or different and are hydrogen, alkyl having 1 to 6 carbon atoms, chloroalkyl having 1 to 6 carbon atoms, aryl having 6 to 10 carbon atoms or aralkyl having 6 to 10 carbon atoms in the aryl moiety and 1 to 6 carbon atoms in the alkyl moiety, $R_3$ and $R_4$ are the same or different and are chlorine, bromine, iodine, hydrogen, alkyl having 1 to 6 carbon atoms, aryl having 6 to 10 carbon atoms or aralkyl having 6 to 10 carbon atoms in the aryl moiety and 1 to 6 carbon atoms in the alkyl moiety and $R_1$ and $R_3$, when taken together with the carbon atom to which they are attached, form a 5- or 6-membered hydrocarbon ring, the molar ratio of (a) to (b) being 1:0.5 to 1:15 and the molar ratio of (a) to (c) being 1:0.3 to 1:10.

2. A process as claimed in claim 1 wherein the graft base is a diene homopolymer or copolymer.

3. A process as claimed in claim 1 wherein the graft base is polybutadiene or a butadiene-styrene copolymer.

4. A process as claimed in claim 1 wherein the graft base is an isoprene homopolymer or copolymer.

5. A process as claimed in claim 1 wherein the cyclic olefin is cyclopentene.

6. A process as claimed in claim 1 wherein the graft base is 0.1 to 90 % by weight of the total of monomer and polymer.

* * * * *